United States Patent
Dral et al.

(10) Patent No.: US 8,156,820 B2
(45) Date of Patent: Apr. 17, 2012

(54) DEVICE AND METHOD FOR TIGHTENING A NUT PLACED ON A THREADED END, AND ASSEMBLED WASHER AND NUT FOR SUCH A DEVICE

(75) Inventors: Nico Anthonie Dral, Maarn (NL); Matheus Theodoor Hendrik Marie Van Kortenhof, Groesbeek (NL)

(73) Assignee: Industrial Bolting Technology and Supply Group (NL)

( * ) Notice: Subject to any disclaimer, the term of this patent is extended or adjusted under 35 U.S.C. 154(b) by 287 days.

(21) Appl. No.: 12/518,588

(22) Filed: Dec. 28, 2009

(65) Prior Publication Data

US 2010/0116101 A1    May 13, 2010

(30) Foreign Application Priority Data

Dec. 15, 2006    (NL) ...................................... 1033069

(51) Int. Cl.
*B25B 23/14*    (2006.01)
(52) U.S. Cl. ...................................... 73/761; 73/862.21
(58) Field of Classification Search ............... 73/761, 73/862.21
See application file for complete search history.

(56) References Cited

U.S. PATENT DOCUMENTS

| 4,322,193 | A | * | 3/1982 | Stahl ............................... 411/11 |
| 5,142,914 | A | * | 9/1992 | Kusakabe et al. ............... 73/723 |
| 5,323,643 | A | * | 6/1994 | Kojima et al. ............. 73/114.21 |
| 5,343,759 | A | * | 9/1994 | Hesthamar et al. ............. 73/761 |
| 5,392,654 | A | * | 2/1995 | Boyle ............................. 73/761 |
| 6,250,863 | B1 | | 6/2001 | Kamentser et al. |
| 6,575,039 | B2 | * | 6/2003 | Murai et al. .................... 73/756 |
| 7,291,131 | B2 | * | 11/2007 | Call ............................. 604/187 |
| 2005/0058524 | A1 | | 3/2005 | Junkers |
| 2007/0200723 | A1 | * | 8/2007 | Newberg .................... 340/686.4 |

* cited by examiner

*Primary Examiner* — Max Noori
(74) *Attorney, Agent, or Firm* — Roylance, Abrams, Berdo & Goodman L.L.P.

(57) ABSTRACT

Device (10, 20, 30) and method for tightening a bolt (2) or a nut (12) threaded on its end, which end extends through at least a first body (3) and screws into a hole (5) in a second body (4) or extends through the second body into another nut (13). The device has gripping means (7, 17) co-acting with the bolt-head or the nuts. Means (8) process a signal generated by sensor means (18) subject to the axial force exerted on the surface of the first body by the bolt-head or the first nut, or on the surface of the second body by the second nut, and control the device such that the bolt-head or a nut is tightened subject to the axial force exerted on the surface of one of the bodies, which sensor means are in an annular body (16) around the threaded hole between the bolt-head or first nut and the first body or between the second nut and second body.

10 Claims, 7 Drawing Sheets

DEVICE AND METHOD FOR TIGHTENING A NUT PLACED ON A THREADED END, AND ASSEMBLED WASHER AND NUT FOR SUCH A DEVICE

The invention relates to a device for tightening a bolt head with threaded end or a first nut placed on a threaded end, which threaded end extends through a hole in at least a first fixed body and is screwed into a threaded hole in a second fixed body, or extends through a hole in a second fixed body and is screwed into a second nut, which device is provided with gripping means co-acting with the bolt head or the first or the second nut.

It is known to secure a nut on a threaded end using for instance a hydraulically, pneumatically or electrically driven torque wrench. A rotatable socket, the internal dimensions of which correspond to the external dimensions of the nut, is herein placed over the nut and set into rotation until a predetermined value of the torque exerted on the nut is reached and the rotation stops.

The known torque wrench has the drawback that the value of the force exerted on the surface of the first or second fixed body by the nut in axial direction of the threaded end has a great distribution, even if the torque is adjusted very precisely. A cause of this is that the axial force resulting at a determined adjusted torque depends on, among other factors, the friction force which occurs between the screw thread flank of the nut and the threaded end and between the support surface of the nut and the surface with which this nut is in contact. These friction forces are determined by, among other factors, the type of lubrication applied, the tolerances in the dimensioning of the co-acting screw threads, the shearing and bending forces which occur, the degree of parallelism of the co-acting contact surfaces, the composition of the applied materials and the condition of the surfaces in question. It is known that the force exerted in axial direction by different nuts, which are secured to the surface of a first flange at the same set value for the torque exerted using a torque wrench, in order to couple this first flange to a second flange can differ by up to about 40%. Such differences are undesirable with a view to the reliability and the durability of the intended coupling of the flanges.

It is further known to secure a nut on a threaded end using for instance a hydraulic jack system. The jack system is herein used to pull on the threaded end until a predetermined value of the exerted tensile force is reached, after which the nut is tightened manually or mechanically onto the surface of the body for securing and the tensile force exerted by the jack system is then reduced to zero. It is known that the maximum exerted tensile force is here not transferred integrally to the threaded end locked by the tightened nut. The extent to which the tensile force is transferred is determined by, among other factors, the ratio between length and diameter of the threaded end, the extent to which the threaded end is perpendicular to the surface of the first fixed body, the operating method of an operative, the possibly applied gaskets, friction occurring between the co-acting screw threads and roughness and contamination of the contact surfaces in question. It is known that in order to couple this first flange to a second flange the force exerted in axial direction by different nuts secured on the surface of a first flange at the same set axial bias can differ by up to about 50%. Such differences are undesirable with a view to the reliability and the durability of the intended coupling of the flanges.

It is an object of the invention to provide a device whereby a bolt head with threaded end or a nut placed on a threaded end can be tightened with great precision with a preset value of the force exerted by this bolt head or nut in axial direction of the threaded end.

It is a further object to provide such a device which is suitable for application with different types of bolt and nut which may or may not be provided with a standard washer.

It must be possible to supply the power required for this device in any usual form, for instance hydraulic, pneumatic or electrical.

These objectives are achieved, and other advantages gained, with a device of the type stated in the preamble, wherein according to the invention processing and control means are provided for processing a signal generated by sensor means subject to the force exerted in axial direction of the threaded end on the surface of the first fixed body by the bolt head or the first nut, or on the surface of the second fixed body by the second nut, and for controlling the device in a manner such that the bolt head, the first or the second nut is tightened subject to the force exerted in axial direction of the threaded end on the surface of the first fixed body by the bolt head or the first nut, or on the second fixed body by the second nut, which sensor means are received in an annular body arranged round the threaded end between the bolt head or the first nut and the first fixed body or between the second nut and the second fixed body.

A device according to the invention makes it possible to tighten a bolt or nut directly in axial force-controlled manner, this in contrast to the above described known devices, which operate in torque-controlled manner or, using a jack, indirectly in axial force-controlled manner with intervention by an operator.

The signal generated by the sensor means can be transmitted to the processing and control means in per se known manner using a cable.

In a preferred embodiment of a device according to the invention transmission means are provided for wireless transmission to the processing and control means of the signal generated via the sensor means.

These transmission means are for instance adapted to send and receive a radiographic signal or a light signal, in particular an infrared signal.

The sensor means are for instance formed by a film of a magneto-elastic material which is received, surrounded by a pick-up coil, in an annular holder as known from European patent publication EP 0 814 328.

In a simple embodiment the sensor means are received in a washer, the inner diameter of which corresponds to the diameter of the threaded end.

In another embodiment the sensor means are received on the peripheral surface, for instance in a peripheral groove, of a nut or ring, the screw thread of which co-acts with the screw thread of the threaded end.

In a subsequent embodiment the sensor means are received in an annular part of an assembled washer which is adapted to tighten a nut to be placed on this washer.

Such a washer is for instance assembled from a screw thread segment and a ring, wherein the ring is provided with a gripping profile corresponding to the gripping means and wherein the screw thread segment is received in the ring with a press fit and is provided with an internal screw thread co-acting with an external screw thread of the threaded end.

Using a gripping means suitable for the purpose, such a washer is particularly suitable, in combination with a normal nut, for the purpose of tightening this nut.

In yet another embodiment the sensor means are received in an annular part of an assembled nut which is adapted for tightening of this nut in axial direction of the threaded end in the absence of a torque exerted on the threaded end.

Such an assembled nut is for instance assembled from an outer nut, an inner nut and a washer, wherein the outer nut is provided with a gripping profile corresponding to the gripping means and with an internal screw thread co-acting with an external screw thread of the inner nut, wherein the inner nut is further provided on an outer end with an internal peripheral profile for inserting therein a locking element for the purpose of locking the inner nut against rotation, and on another outer end with an internal screw thread corresponding to the threaded end and with an external peripheral profile in axial direction corresponding to an internal axial peripheral profile in the washer. A rotation of the outer nut in the correct direction by means of exerting an external torque, while simultaneously locking the inner nut against rotation, results in an axial displacement of the inner nut relative to the washer with simultaneous axial displacement of the threaded end coupled to the inner nut relative to the washer and the outer nut.

Such an assembled nut is particularly suitable for use in difficult conditions, for instance at high temperatures, extremely high forces or a limited accessibility of the nut.

The invention further relates to a method for simultaneously tightening at least two bolt heads with threaded end or two first nuts placed on a threaded end, which threaded ends extend through a hole in at least a first fixed body and are screwed into a threaded hole in a second fixed body, or extend through a hole in a second fixed body and are screwed into a respective second nut, which method according to the invention is characterized by the simultaneous use of an above described device for each of the bolt heads or nuts for tightening.

The invention will be elucidated hereinbelow on the basis of exemplary embodiments, with reference to the drawings.

In the drawings

FIG. 4a shows an axial cross-section and FIG. 4b a top view of a first example of a nut with sensor for use in combination with a device according to the invention, and FIG. 5a shows an axial cross-section and FIG. 5b a top view of a second example of a nut with sensor for use in combination with a device according to the invention, and FIG. 6a shows an axial cross-section and FIG. 6b a top view of an assembled washer with sensor for use in combination with a device according to the invention.

FIG. 8a shows an axial cross-section and FIG. 8b a top view of a second example of an assembled nut with sensor for use in combination with a device according to the invention.

Corresponding components are designated in the figures with the same reference numerals.

Figure 1:
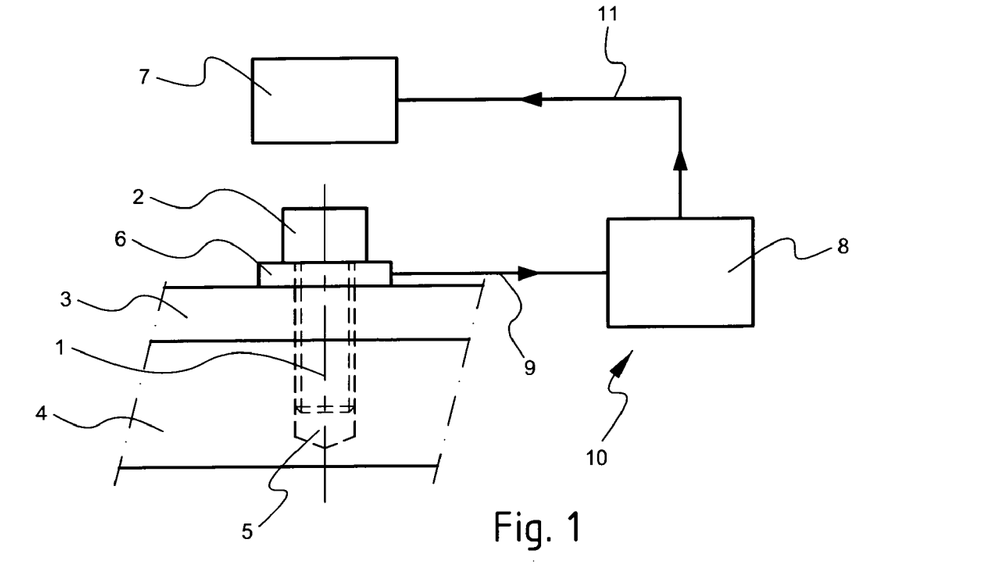
FIG. 1 shows a greatly simplified schematic representation of a first embodiment of a device according to the invention in a first application.

FIG. 1 shows a first tool 10 which is applied for tightening a threaded end 1 with fixed bolt head 2 in order to secure a first fixed body 3 to a second fixed body 4, in which a blind threaded hole 5 is formed. Bolt head 2 rests on a washer 6 in which an axial force sensor (not shown) is received. Tool 10 is assembled from a drive head 7 provided with a rotatable profile (not shown) corresponding to an internal or external profile of bolt head 2, and a processing and control unit 8. The sensor in washer 6 is connected via a cable 9 to processing and control unit 8, which is in turn connected to drive head 7 via a cable 11 (or in some cases to an air hose or a hydraulic hose).

Figure 2:
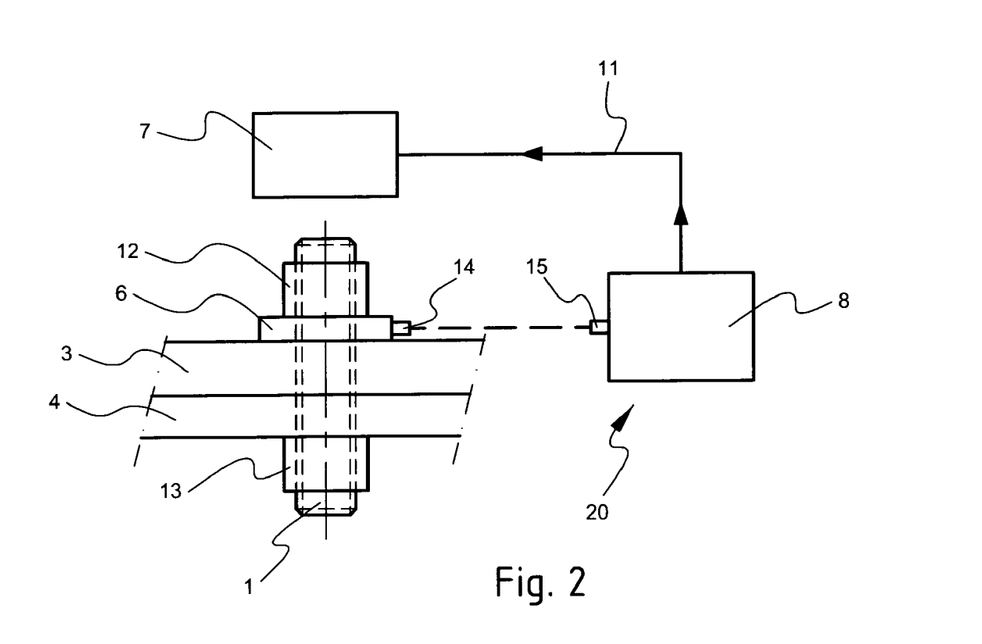
FIG. 2 shows a greatly simplified schematic representation of a second embodiment of a device according to the invention in a second application.

FIG. 2 shows a second tool 20 which is applied for tightening a threaded end 1 with a first nut 12 in order to secure a first fixed body 3, for instance a first flange, to a second fixed body 4, for instance a second flange, wherein threaded end 1 protrudes through a hole through the two flanges, and onto the bottom side of which threaded end a second nut 13 is screwed. First nut 12 rests on a washer 6 in which an axial force sensor (not shown) is received. Tool 20 is assembled from a drive head 7, provided with a rotatable inner profile (not shown) corresponding to the outer periphery of first nut 12, and a processing and control unit 8. The sensor in washer 6 is connected via an infrared transmitter 14 to a receiver 15 in processing and control unit 8, which is in turn connected to drive head 7 via a cable 11.

Figure 3:
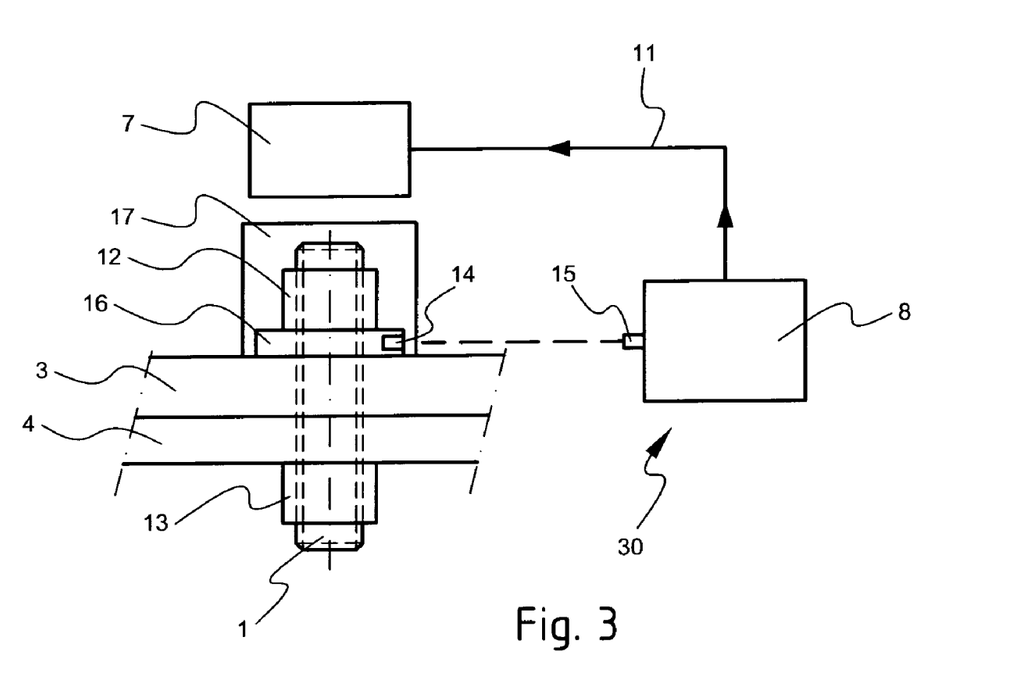
FIG. 3 shows a greatly simplified schematic representation of a third embodiment of a device according to the invention in a third application.

FIG. 3 shows a third tool 30 which is applied for tightening a threaded end 1 with a first nut 12 in order to secure a first fixed body 3, for instance a first flange, to a second fixed body 4, for instance a second flange, wherein threaded end 1 protrudes through a hole through the two flanges and onto the bottom side of which threaded end a second nut 13 is screwed. First nut 12 rests on an assembled washer 16 in which an axial force sensor 18 (shown in FIG. 4a) is received. Washer 16 is assembled from a screw thread segment (shown in FIG. 6a) and an inner ring, wherein the inner ring is provided with a gripping profile corresponding to a first inner profile of an auxiliary tool 17, and wherein the screw thread segment is received with a press fit in the inner ring and is provided with an internal screw thread co-acting with an external screw thread of threaded end 1. Auxiliary tool 17 is provided with a second, rotatable inner profile which corresponds to the outer periphery of first nut 12 and which can be set into rotation by a drive head 7. Tool 30 is assembled from drive head 7, auxiliary tool 17 and a processing and control unit 8. The sensor in washer 16 is connected via an fm radio transmitter 14 to a receiver 15 in processing and control unit 8, which is in turn connected to drive head 7 via a cable 11.

Figure 4:
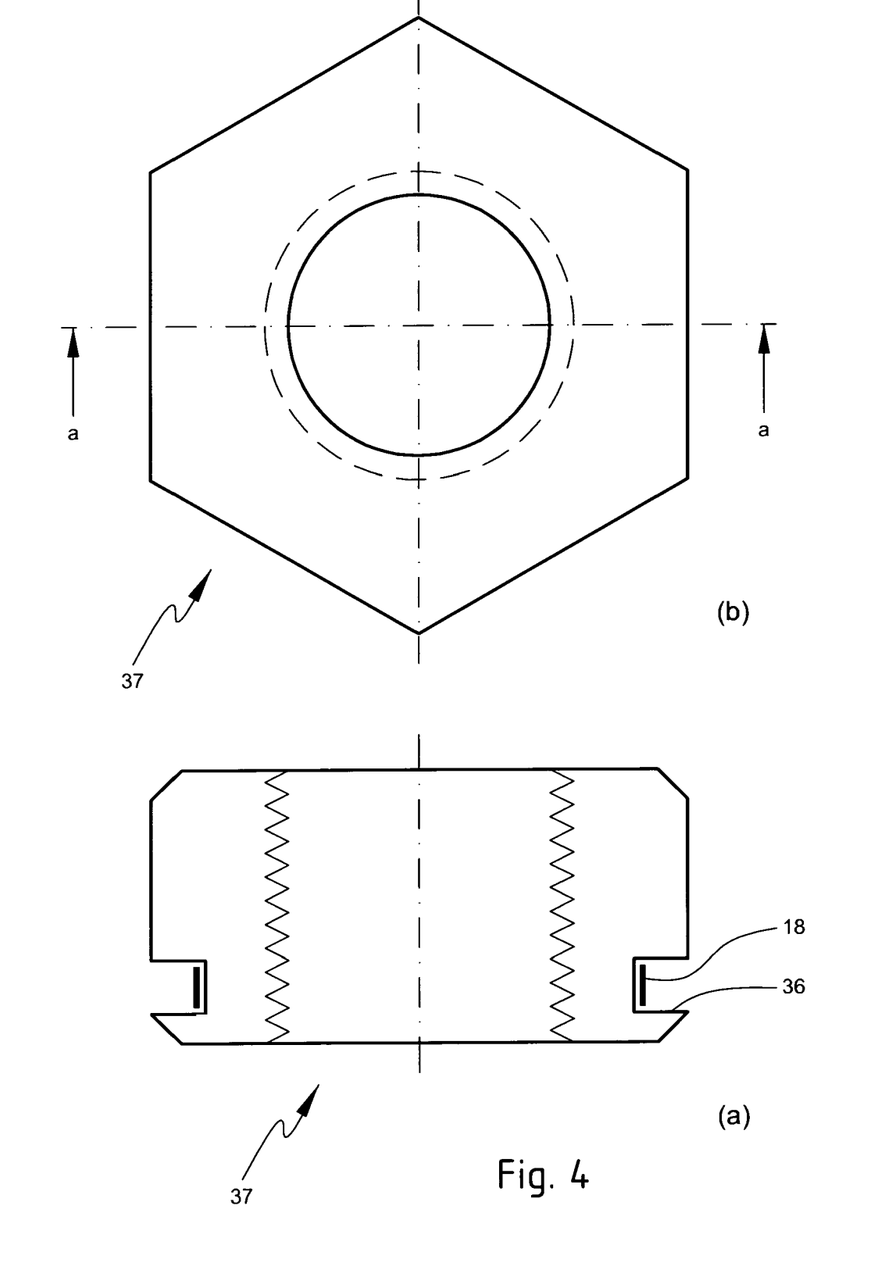

FIG. 4a, b show a nut 37 (FIG. 4a in a cross-section along line a-a in FIG. 4b) which can be fixed on a threaded end 1 using a device 10, 20, 30 according to the invention, wherein sensor 18 is made up of an annular strip of an elasto-magnetic material around which a pick-up coil is wound, and is received in a peripheral groove 36 in nut 37.

Figure 5:
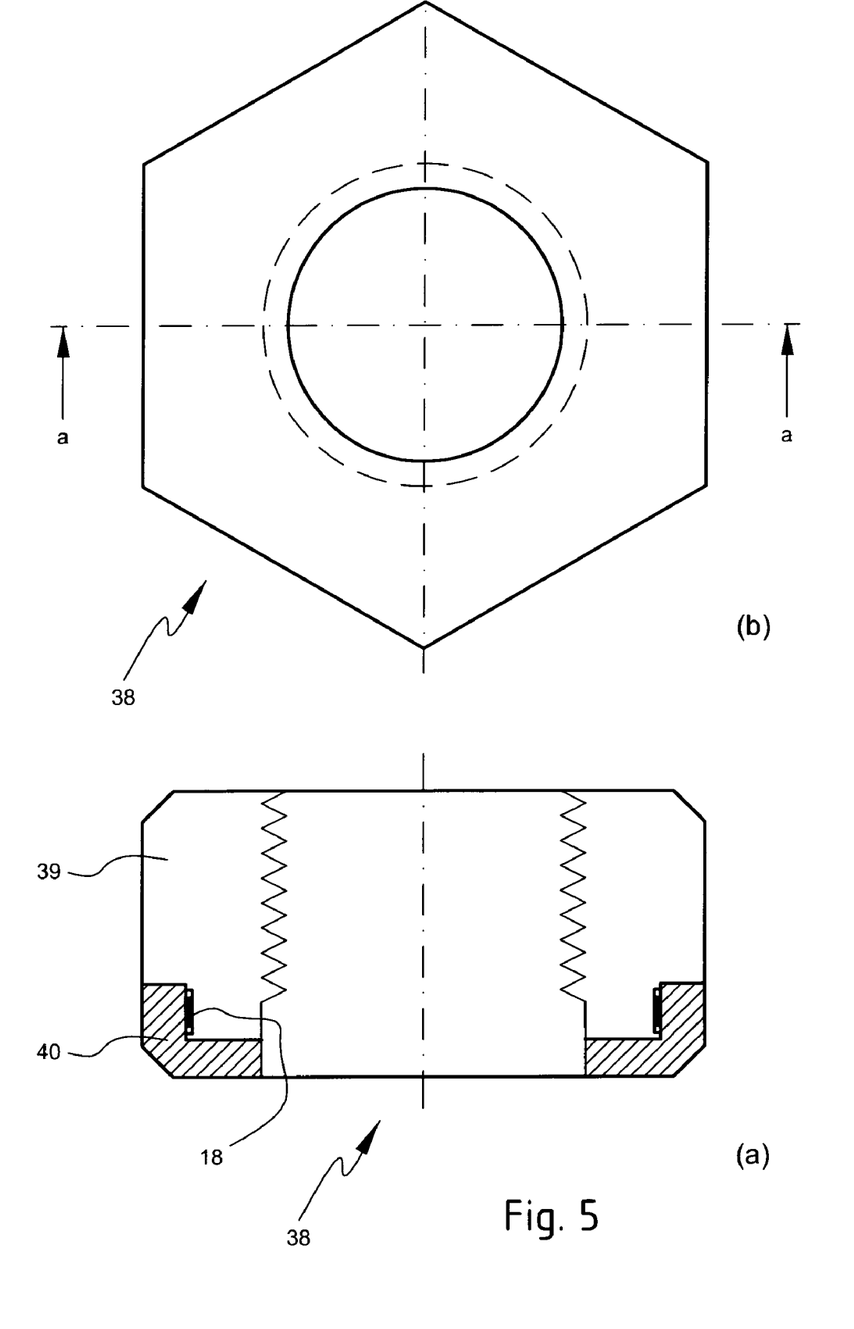

FIG. 5a, b show an assembled nut 38 (FIG. 5a in a cross-section along line a-a in FIG. 5b) which can be fixed on a threaded end 1 using a device 10, 20, 30 according to the invention, wherein sensor 18 is received in a peripheral channel between component parts 39, 40 of nut 38.

Figure 6:
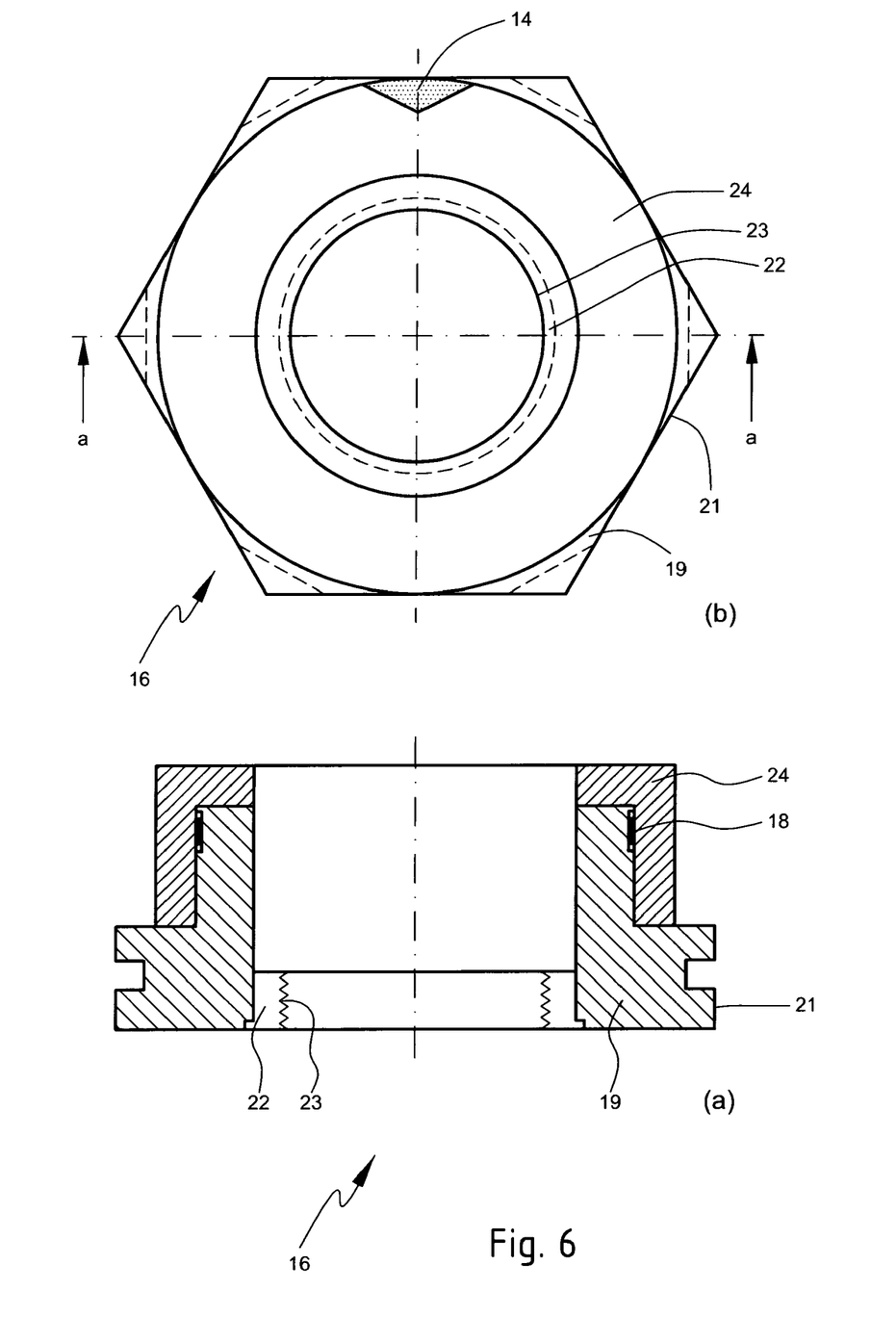

FIG. 6a, b show washer 16 of FIG. 3 (FIG. 6a in a cross-section along line a-a in FIG. 6b) with sensor 18, made up of an inner ring 19 provided with a gripping profile 21 corresponding to the internal gripping profile of auxiliary tool 17 shown in FIG. 3, and of a screw thread segment 22 which is received with a press fit in inner ring 19 and is provided with an internal screw thread 23 co-acting with an external screw thread of threaded end 1. Sensor 18 is assembled from an annular strip of an elasto-magnetic material round which a pick-up coil is wound, and is received between inner ring 19 and an outer ring 24 fitting closely therearound.

Figure 7:
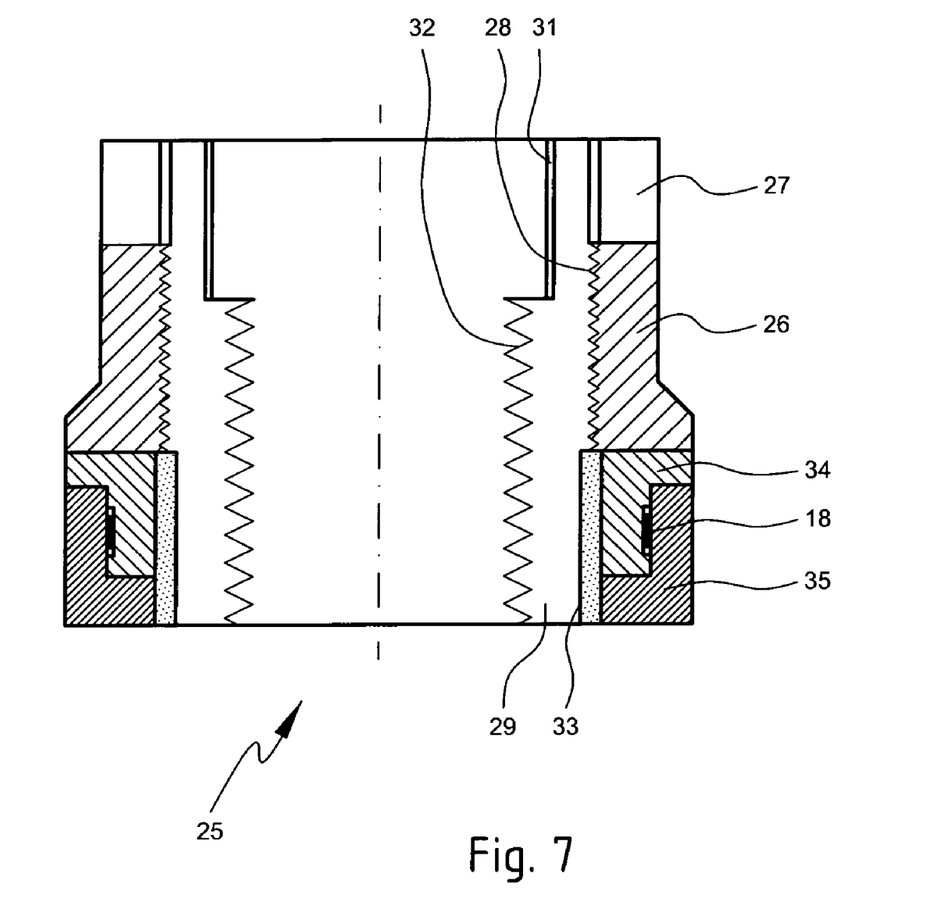
FIG. 7 shows an axial cross-section of a first example of an assembled nut with sensor for use in combination with a device according to the invention.

FIG. 7 shows an axial cross-section of an assembled nut 25 which is assembled from of an inner nut 29 and an outer nut 26, provided with a crenellated edge 27 corresponding to the gripping profile of a drive head, and with an internal screw thread 28 corresponding to an external screw thread of inner nut 29, wherein inner nut 29 is also provided on its top side with an internal spline toothing 31 for insertion therein of a locking element for the purpose of locking inner nut 29 against rotation, and on its bottom side with an internal screw thread 32 corresponding to the threaded end for tightening, and with an external spline toothing 33 corresponding to an internal spline toothing in a washer made up of parts 34, 35, wherein a sensor 18 is enclosed between the component parts 34, 35. A rotation of outer nut 26 in the correct direction by means of exerting an external torque while simultaneously locking inner nut 29 against rotation results in an axial displacement of inner nut 29 relative to washer 34, 35, with simultaneous axial displacement of a threaded end coupled to inner nut 29, wherein the force exerted in axial direction by washer 34, 35 on the surface of a workpiece for connecting can be determined very precisely using sensor 18 and a processing and control device coupled thereto.

Figure 8:
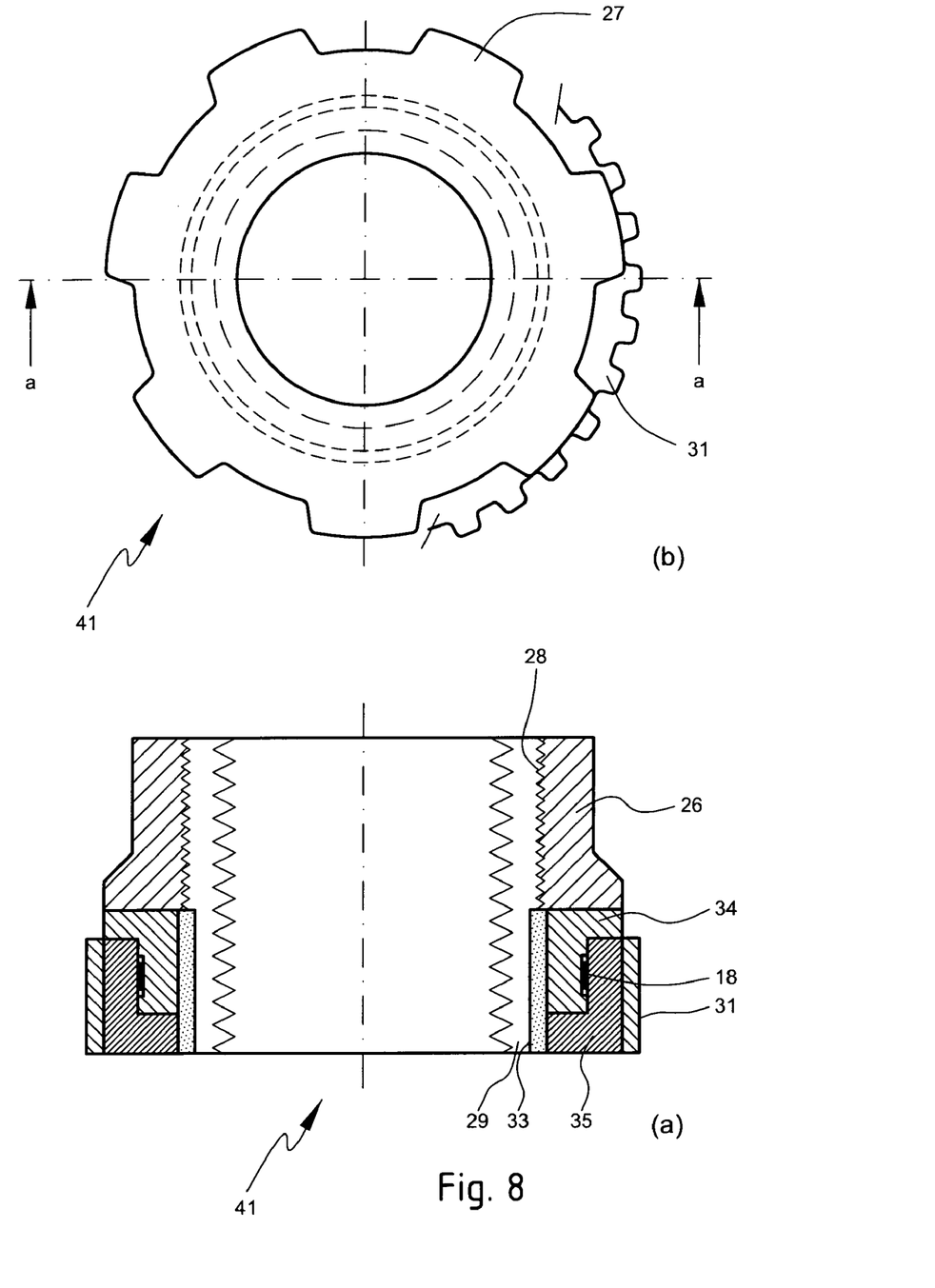

FIG. 8a, b shows an assembled nut 41 (FIG. 8a in a cross-section along line a-a in FIG. 8b), which is assembled from an outer nut 26, an inner nut 29 and a washer 34, 35, wherein outer nut 26 is provided with a spline toothing 27 co-acting with drive head 7 and with an internal screw thread 28 co-acting with an external screw thread of inner nut 29, wherein washer 34, 35 is provided with an external spline toothing 33 for arranging a locking element therearound and with an internal spline toothing 33 which co-acts with an external spline toothing 33 on a part of the outer periphery of inner nut 29 in order to lock washer 34, 35 and the inner nut 29 coupled thereto against rotation. A sensor 18 is enclosed between component parts 34, 35 of washer 34, 35. A rotation of outer nut 26 in the correct direction by means of exerting an external torque, while simultaneously locking inner nut 29 against rotation, results in an axial displacement of inner nut 29 relative to washer 34, 35 with simultaneous axial displacement of a threaded end coupled to inner nut 29, wherein the force exerted in axial direction by washer 34, 35 on the surface of a workpiece for connecting can be determined very precisely using sensor 18 and a processing and control device coupled thereto.

The invention claimed is:

1. Device for tightening a first nut placed on a threaded end, which threaded end extends through a hole in at least a first fixed body and is screwed into a threaded hole in a second fixed body, or extends through a hole in a second fixed body and is screwed into a second nut, which device is provided with gripping means co-acting with the first or the second nut, wherein processing and control means are provided for processing a signal generated by sensor means subject to the force exerted in axial direction of the threaded end on the surface of the first fixed body by the bolt head or the first nut, or on the surface of the second fixed body by the second nut, and for controlling the device in a manner such that the first or the second nut is tightened subject to the force exerted in axial direction of the threaded end on the surface of the first fixed body by the first nut or on the second fixed body by the second nut, which sensor means are received in an annular body arranged around the threaded end between the first nut and the first fixed body or between the second nut and the second fixed body, wherein the sensor means are received in an annular part of an assembled nut which is adapted for tightening of this nut in axial direction of the threaded end in the absence of a torque exerted on the threaded end.

2. Device as claimed in claim 1, wherein transmission means are provided for wireless transmission to the processing and control means of the signal generated by the sensor means.

3. Device as claimed in claim 1 wherein the transmission means are adapted to send and receive an optical or an electrical signal.

4. Device as claimed in claim 1 wherein the sensor means are received in a washer, the inner diameter of which corresponds to the diameter of the threaded end.

5. Nut to be fixed onto a threaded end using a device for tightening a bolt head with threaded end or a first nut placed on a threaded end, which threaded end extends through a hole in at least a first fixed body and is screwed into a threaded hole in a second fixed body, or extends through a hole in a second fixed body and is screwed into a second nut, which device is provided with gripping means co-acting with the bolt head or the first or the second nut, wherein processing and control means are provided for processing a signal generated by sensor means subject to the force exerted in axial direction of the threaded end on the surface of the first fixed body by the bolt head or the first nut, or on the surface of the second fixed body by the second nut, and for controlling the device in a manner such that the bolt head, the first or the second nut is tightened subject to the force exerted in axial direction of the threaded end on the surface of the first fixed body by the bolt head or the first nut, or on the second fixed body by the second nut, which sensor means are received in an annular body arranged round the threaded end between the bolt head or the first nut and the first fixed body or between the second nut and the second fixed body, wherein the sensor means are arranged on the peripheral surface of the nut.

6. Assembled nut to be fixed onto a threaded end using a device for tightening a bolt head with threaded end or a first nut placed on a threaded end, which threaded end extends through a hole in at least a first fixed body and is screwed into a threaded hole in a second fixed body, or extends through a hole in a second fixed body and is screwed into a second nut, which device is provided with gripping means co-acting with the bolt head or the first or the second nut, wherein processing and control means are provided for processing a signal generated by sensor means subject to the force exerted in axial direction of the threaded end on the surface of the first fixed body by the bolt head or the first nut, or on the surface of the second fixed body by the second nut, and for controlling the device in a manner such that the bolt head, the first or the second nut is tightened subject to the force exerted in axial direction of the threaded end on the surface of the first fixed body by the bolt head or the first nut, or on the second fixed body by the second nut, which sensor means are received in an annular body arranged round the threaded end between the bolt head or the first nut and the first fixed body or between the second nut and the second fixed body, wherein the sensor means are received between the component parts of the nut.

7. Assembled washer which is adapted to tighten onto a threaded end in axial direction of the threaded end a nut to be placed on this washer in the absence of a torque exerted on the threaded end, provided with sensor means for use in combination with a device for tightening a bolt head with threaded end or a first nut placed on a threaded end, which threaded end extends through a hole in at least a first fixed body and is screwed into a threaded hole in a second fixed body, or extends through a hole in a second fixed body and is screwed into a second nut, which device is provided with gripping means co-acting with the bolt head or the first or the second nut, in which device processing and control means are provided for processing a signal generated by sensor means subject to the force exerted in axial direction of the threaded end on the surface of the first fixed body by the bolt head or the first nut, or on the surface of the second fixed body by the second nut, and for controlling the device in a manner such that the bolt head, the first or the second nut is tightened subject to the force exerted in axial direction of the threaded end on the surface of the first fixed body by the bolt head or the first nut, or on the second fixed body by the second nut, which sensor means are received in an annular body arranged round the threaded end between the bolt head or the first nut and the first fixed body or between the second nut and the second fixed body, in which device the sensor means are received in an annular part of an assembled washer which is adapted to tighten a nut to be placed on this washer, wherein it is assembled from a screw thread segment and an inner ring provided with a gripping profile corresponding to the gripping means, which screw thread segment is received in the inner ring with a press fit and is provided with an internal screw thread co-acting with an external screw thread of the threaded end.

8. Assembled nut which is adapted for tightening of this nut onto a threaded end in axial direction of the threaded end in the absence of a torque exerted on the threaded end, provided with sensor means for use in combination with a device as claimed in claim 1.

9. Nut as claimed in claim 8, wherein it is assembled from an outer nut, an inner nut and a washer, wherein the outer nut is provided with a gripping profile co-acting with the gripping means and with an internal screw thread co-acting with an external screw thread of the inner nut, wherein the inner nut is provided on an outer end with an internal peripheral profile for insertion therein of a locking element for the purpose of locking the inner nut against rotation, and on another outer end with an internal screw thread corresponding to the threaded end and with an external peripheral profile in axial direction which co-acts with an internal axial peripheral profile in the washer.

10. Nut as claimed in claim 8, wherein it is assembled from an outer nut, an inner nut and a washer, wherein the outer nut is provided with a gripping profile co-acting with the gripping means and with an internal screw thread co-acting with an external screw thread of the inner nut, wherein the washer is provided with an external peripheral profile in axial direction for arranging therearound of a locking element for the purpose of locking the washing against rotation, and with an internal peripheral profile in axial direction which co-acts with an external axial peripheral profile on a part of the outer periphery of the inner ring.

* * * * *